United States Patent
Jackman et al.

(10) Patent No.: US 7,308,175 B1
(45) Date of Patent: Dec. 11, 2007

(54) FIBER OPTIC STRUCTURES THAT ALLOW SMALL BEND RADII

(75) Inventors: William S. Jackman, Hickory, NC (US); Warren W. McAlpine, Hickory, NC (US); David A. Seddon, Hickory, NC (US); Richard S. Wagman, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/590,508

(22) Filed: Oct. 31, 2006

(51) Int. Cl.
 *G02B 6/44* (2006.01)
(52) U.S. Cl. .................. 385/102; 385/100; 385/107
(58) Field of Classification Search ................ 385/102
 See application file for complete search history.

(56) References Cited

U.S. PATENT DOCUMENTS

| | | | |
|---|---|---|---|
| 4,723,831 A * | 2/1988 | Johnson et al. | 385/111 |
| 5,557,703 A * | 9/1996 | Barker et al. | 385/128 |
| 6,957,000 B2 | 10/2005 | McAlpine et al. | 385/102 |
| 2003/0007757 A1* | 1/2003 | Rogers | 385/114 |
| 2004/0086242 A1* | 5/2004 | McAlpine et al. | 385/102 |

OTHER PUBLICATIONS

Draka Product Sheet, BendBright$^{XS}$ Single Mode Optical Fibre, 2 sheets, Aug. 2006.

* cited by examiner

*Primary Examiner*—Frank G. Font
*Assistant Examiner*—Ryan Lepisto
(74) *Attorney, Agent, or Firm*—Michael E. Carroll, Jr.

(57) ABSTRACT

A buffered optical fiber includes at least one optical fiber and a buffer layer. In one embodiment, the buffer layer generally surrounds the optical fiber and has a non-round cross-section that includes a plurality of wings that are an integrally formed by the buffer layer. Additionally, the buffered optical fiber may form a portion of a fiber optic cable that allows a relatively small bend radius while maintaining optical performance. Optionally, the optical fiber may be a bend resistant optical fiber for preserving optical performance. Additionally, other fiber optic cables that allow relatively small bend radii are also disclosed.

20 Claims, 5 Drawing Sheets

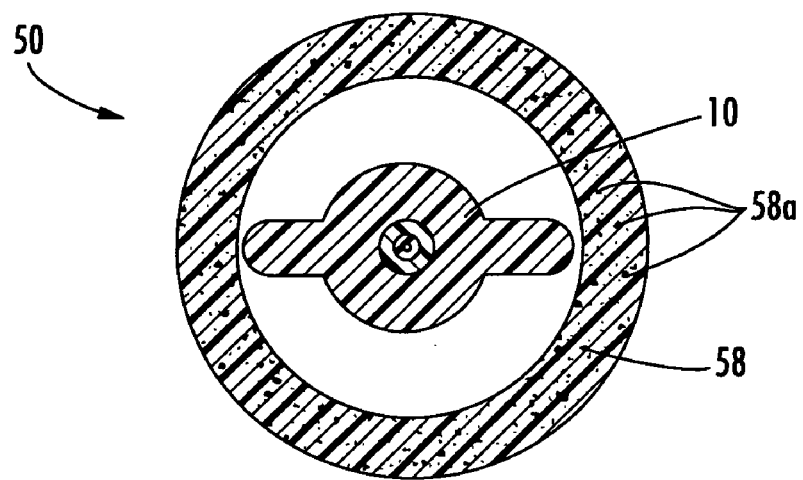
FIG. 5
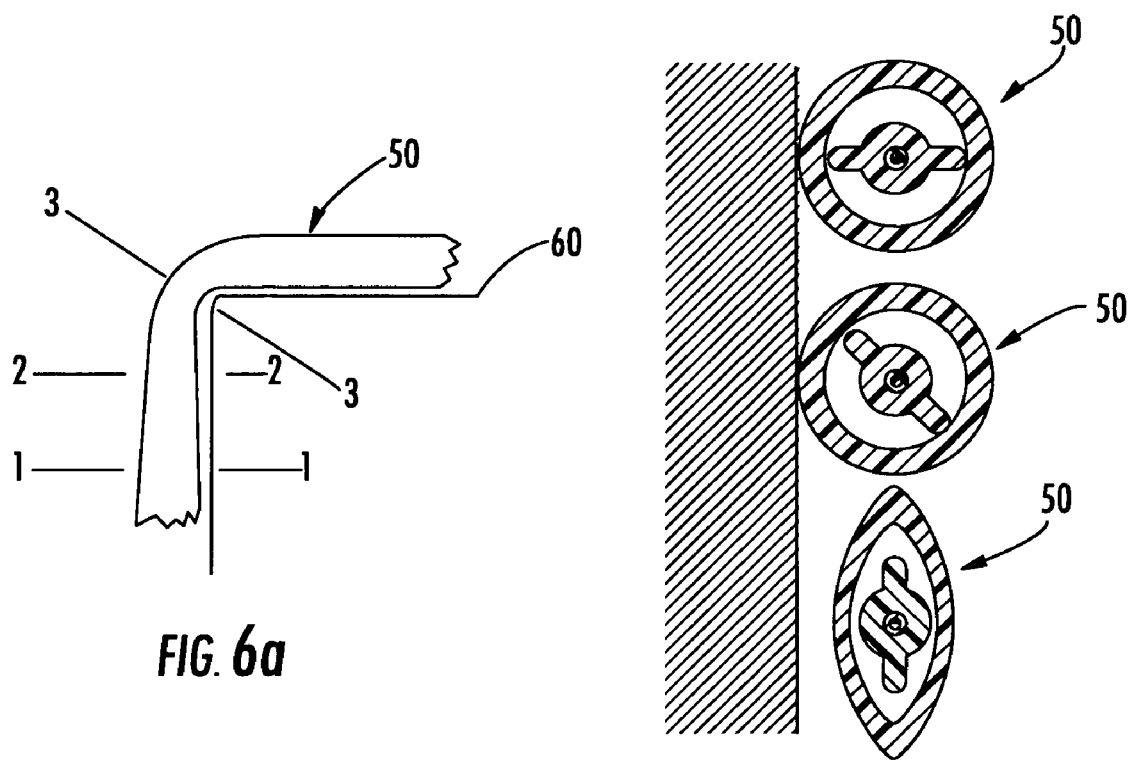
FIG. 6a
FIG. 6b

FIBER OPTIC STRUCTURES THAT ALLOW SMALL BEND RADII

FIELD OF THE INVENTION

The present invention relates generally to fiber optic cables used for indoor, outdoor, and/or indoor/outdoor use. More specifically, the present invention relates to fiber optic cables that allow relatively small bend radii while preserving optical performance.

BACKGROUND OF THE INVENTION

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data with a reasonable cable diameter. Consequently, optical fiber cables replaced most of the copper cables in long-haul communication network links, thereby providing greater bandwidth capacity for long-haul links. However, most communication networks still use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from fully utilizing the relatively high-bandwidth capacity of the optical fiber long-hauls links.

As optical fibers are deployed deeper into communication networks, subscribers will have access to increased bandwidth. But certain obstacles exist that make it challenging to route optical fibers/optical cables toward the subscriber. For instance, the connection of subscribers to the communication network requires a low-cost solution that is user-friendly for installation, connectorization, and versatility. Moreover, the reliability and robustness of the distribution fiber optic cable may have to maintain the rigors of an outdoor environment. For instance, outdoor fiber optic cables can have rigid strength members such as glass-reinforced platic strength members that stiffen the cable and inhibit the bending of the cable beyond a minimum bend radius, thereby preserving optical performance. On the other hand, indoor fiber optic cables may use less rigid strength members such as aramid yarns that allow bending of the fiber optic cable into a much smaller radius. But no matter the structure, the craft understands that conventional fiber optic cable designs typically have a minimum bend radius that should not be exceeded.

Moreover, the craft understands that bending fiber optic cables beyond their minimum bend radius can cause significant increases in optical attenuation. Thus, the craft avoids bending fiber optic structures beyond their minimum bend radius. As fiber optic cables push toward the subscriber the end user or installer may not be a highly trained craftsman that understands that bending the fiber optic cable into a relatively small radius can cause significant optical attenuation. Consequently, there is a need for fiber optic cable designs that are robust and allow for aggressive bending of the same without causing undue optical attenuation.

SUMMARY OF THE INVENTION

One aspect of the present invention is directed to a buffered optical fiber including at least one optical fiber and a buffer layer. The buffer layer generally surrounds the optical fiber and has a non-round cross-section that includes a plurality of wings that are an integrally formed by the buffer layer.

Another aspect of the present invention is directed to a buffered optical fiber including at least one optical fiber and a buffer layer. The optical fiber is a bend resistant optical fiber that allow improved bend performance and the buffer layer generally surrounds the at least one optical fiber. Additionally, the buffer layer has a non-round cross-section that includes a first wing and a second wing. When the first and second wings are disposed about 180 degrees apart they impart a preferential bend characteristic to the buffered optical fiber.

Still another aspect of the present invention is directed to a fiber optic cable including at least one optical fiber, a buffer layer, and a cable jacket. The optical fiber is a bend resistant optical fiber and the buffer layer generally surrounds the at least one optical fiber. The cable jacket is disposed about the buffered optical fiber and allows a bend radius of about 10 millimeters or less while maintaining a suitable level of optical performance. The buffer layer may have a generally non-round cross-section that includes a first wing and a second wing where the first wing and the second wing are disposed about 180 degrees apart.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain principals and operations of the invention.

BRIEF DESCRIPTION OF THE DRAWINGS

FIG. 5 is a cross-sectional view of a fiber optic cable that includes the buffered optical fiber of FIG. 1 according to the present invention.

FIG. 6a depicts the fiber optic cable of FIG. 5 bent about an outside corner and depicts a series of planes through the cross-section of the same.

FIG. 6b represents a series of cross-sectional views corresponding to the series of planes of FIG. 6a depicting cross-sections of the fiber optic cable of FIG. 5 at different points.

DETAILED DESCRIPTION OF THE INVENTION

Figure 1:
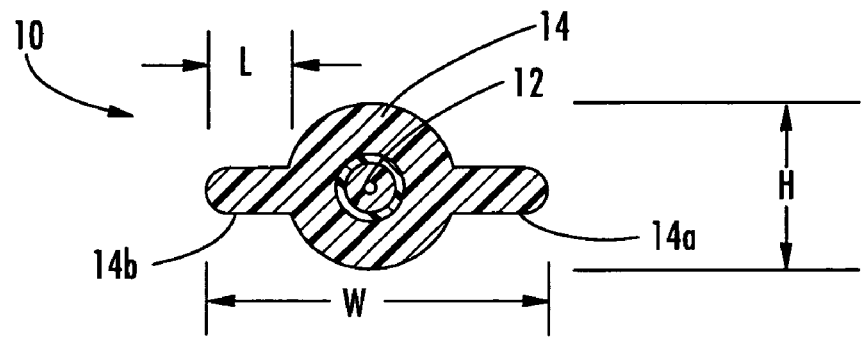
FIG. 1 is a cross-sectional view of a buffered optical fiber according to the present invention.

Reference will now be made in detail to the present preferred embodiments of the invention, examples of which are illustrated in the accompanying drawings. Whenever practical, the same reference numerals will be used throughout the drawings to refer to the same or like parts. FIG. 1 depicts a cross-sectional view of a buffered optical fiber 10 according to the present invention. Buffered optical fiber 10 includes at least one optical fiber 12 and a buffer layer 14. Buffer layer 14 generally surrounds the at least one optical fiber 12 and has a non-round cross-section that includes a plurality of wings. More specifically, buffer layer 14 includes a first wing 14a and a second wing 14b. Generally speaking, first wing 14a and second wing 14b are an integral portion of buffer layer 14 (i.e., formed from the same material) and are disposed about 180 degrees apart, but they may have other suitable arrangements. Buffered optical fiber 10 is advantageous since, for instance, it may provide protection to the optical fiber 12, provide coupling for the same within a fiber optic cable, aid in removing buffer layer 14, and/or the wings allow for securing or attaching the same with a fastener.

Buffer layer 14 can be formed from any suitable material such as a polymer, radiation-curable material, or the like. For instance, one embodiment uses a suitable flame retardant material such as polyvinylchloride (PVC) for buffer layer 14, thereby permitting indoor use of the same. Likewise, buffered optical fiber of the present invention can use any suitable optical fiber. For instance, buffered optical fiber 10 can include a bend resistant optical fiber for allowing relatively small bend radii while maintaining optical performance as discussed herein. Of course, other types of optical fibers may be used.

Besides using different materials, buffer layer 14 may have any suitable size. By way of example, buffer layer 14 may be sized for an optical fiber having a 250 micron outer diameter. More specifically, buffer layer 14 sized for a 250 micron optical fiber would have a height (i.e., the diameter of the generally round body portion that excludes the wings) of about 0.90 millimeters and an overall width of about 1.8 millimeters so that the wings would have a length of about 0.45 millimeters. Wings can have any suitable thickness such as about 0.60 millimeters. Of course, buffer layer 14 may accommodate one or more optical fibers having outer diameters other than 250 microns.

Figure 1A:
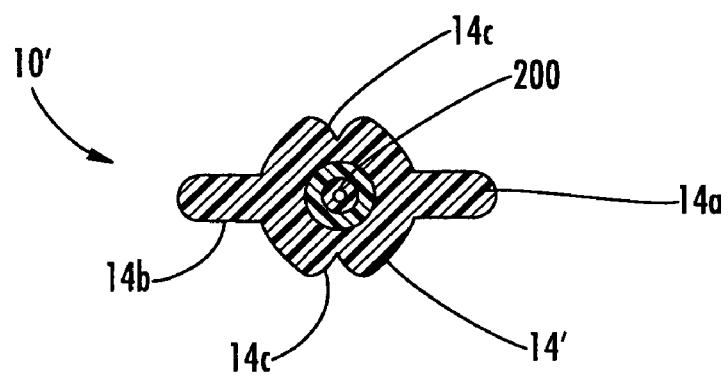
FIG. 1a is a cross-sectional view of another buffered optical fiber having a preferential tear portion according to the present invention.
Figure 3:
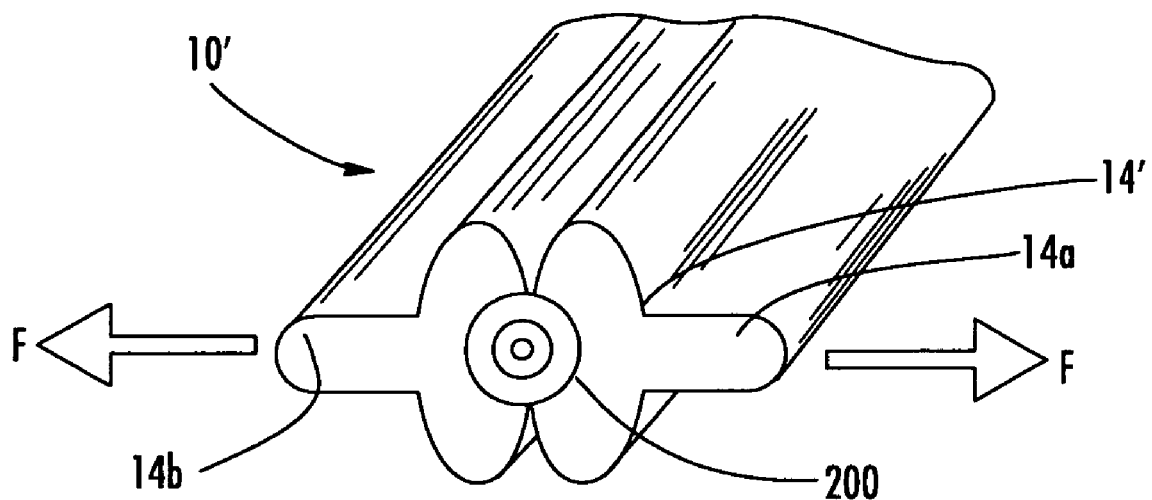
FIG. 3 is a perspective view depicting a separation force applied to the wings of the buffered optical fiber of FIG. 2 for tearing the buffer layer.

FIG. 1a depicts a cross-sectional view of a buffered optical fiber 10' according to the present invention. Buffer optical fiber 10' is similar to buffered optical fiber 10, but further includes a bend resistant optical fiber 200 disposed within a buffer layer 14', which has at least one preferential tear portion 14c formed therein. As shown, buffer layer 14' also includes two preferential tear portions 14c that are disposed about 180 degrees apart generally about midway between wings 14a,14b. Including preferential tear portions 14c allows for the initiation of material fracture when a sufficient pulling force is applied to wings 14a,14b as depicted in FIG. 3. More specifically, the arrows (not labeled) represent a separation force F being applied to wings 14c for initiating and propagating a tear in buffer layer 14' generally along preferential tear portions 14c. Separation force F can be applied by the craft grasping wings 14a,14b with their fingers and/or tools. Moreover, including preferential tear portions 14a,14b may aid in preserving optical performance since they reduce the hoop strength of buffer layer 14, thereby allowing buffer layer 14 to "relax" when cooling. In other words, preferential tear portions allows buffer layer 14 to shrink generally evenly when cooled, thereby reducing residual stress/strain in buffer layer 14 and preserving optical performance.

Figure 2:
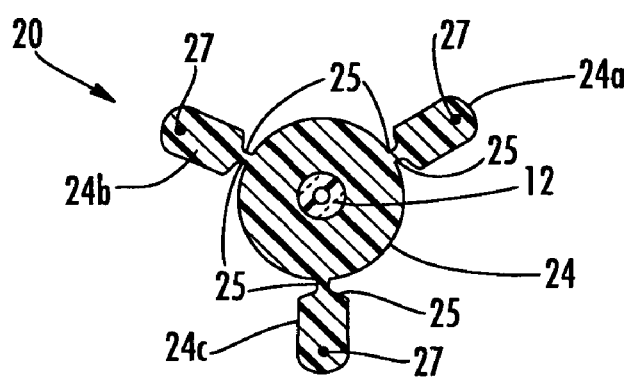
FIG. 2 is a cross-sectional view of another buffered optical fiber according to the present invention.

FIG. 2 depicts another variation of a buffered optical fiber 20 according to the present invention. Buffered optical fiber 20 includes at least one optical fiber 12 and a buffer layer 24 having a plurality of wings that each include at least one strength element 27 therein. As depicted, buffer layer 24 includes three wings 24a,24b,24c. Each wing 24a,24b,24c also includes at least one strength element 27 therein for providing tensile strength for each wing such as during removal of the buffer layer. Strength element may be any suitable material such as a fiberglass, aramid, or the like. In this embodiment, the plurality of wings are evenly spaced (i.e., about 120 degrees apart) about the periphery of buffer layer 24; however, the plurality of wings need not be evenly spaced about the periphery. Additionally, wings 24a, 24b, 24c include one or more bending relief portions 25 where they connect with a body portion (not numbered) of buffer layer 24. Bending relief portions 25 allow the plurality of wings to deflect easier than they would otherwise such as within a cable jacket. Besides bending relief portions, deflection of the wings is dependent on factors such as the thickness of the wings and material properties.

Figure 4:
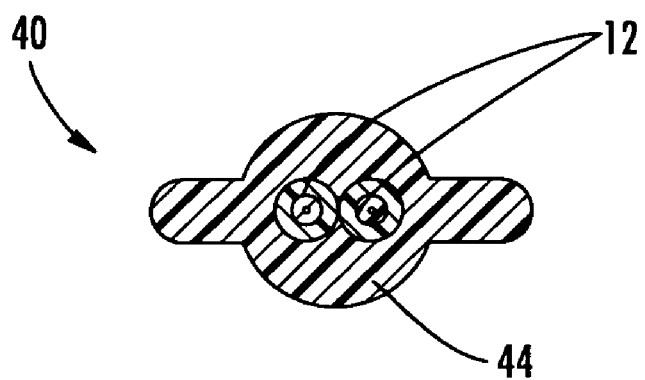
FIG. 4 is a cross-sectional view of a buffered optical fiber having a plurality of optical fibers according to the present invention.

FIG. 4 is a cross-sectional view of a buffered optical fiber 40 according to the present invention. Buffered optical fiber 40 is similar to buffered optical fiber 10, but further includes a plurality of optical fibers 12 disposed within a buffer layer 44. As depicted, the optical fibers 12 are disposed adjacent to each other within buffer layer 44. Additionally, buffered optical fiber 40 may include one or more preferential tear portions to aid the removal of buffer layer 44.

Additionally, buffered optical fibers according to the present invention can form a portion of a fiber optic cable that allows relatively small bend radii while preserving optical performance. By way of example, FIG. 5 depicts a cross-sectional view of a fiber optic cable 50 according to the present invention. Fiber optic cable 50 includes buffered optical fiber 10 disposed within a cable jacket 58. Furthermore, fiber optic cable 50 has a relatively small size. Consequently, fiber optic cable 50 is relatively flexible when the preferential bend axis of the buffered optical fiber aligns with bend of the fiber optic cable. For instance, fiber optic cable 50 has an outer diameter of about 3 millimeters or less when using buffered optical fiber 10 with the width W of about 1.8 millimeters. Moreover, the wings of the buffered optical fiber advantageously aid in coupling the buffered optical fiber with the cable jacket.

Furthermore, cable jacket 58 allows for relatively small bend radii since it may kink (i.e., a discontinous bend radius where deformation of the cross-section occurs) when bent about a sharp radii such as about a 90 degree corner. Cable jacket 58 allows kinking by using a suitable material that deforms when subject to a sharp bending radii such as about 30 millimeters or less such as at about 25 millimeters. For instance, cable jacket 58 is formed from a polymer having a filling material for providing strength, stiffness, and/or inhibiting post-extrusion shrinkage. More specifically, in one embodiment cable jacket 58 is a polymer such as PVC having a glass filling material 58a such as e-glass that is generally uniformly distributed in cable jacket 58. Thus, cable jacket 58 has a non-preferential bend, while buffered optical fiber 10 has a preferential bend so it has a tendency to rotate when fiber optic cable 50 is bent. Of course, using other types of polymers and/or filling materials 58a are possible. For instance, the cable jacket may be formed from a thermoplastic fluoropolymer such as polyvinylidene fluoride (PVDF) or if intended for outdoor applications a polyethylene (PE) or polyurethane (PU). Further, semi-cystralline materials such as PE and PU may be advantageous since they can indicate abusive use/installation since they will tend to stress-whiten with relatively high-levels of plastic deformation (e.g., 3-4% strain), thereby indicating abusive use to the craft. If the fiber optic cable is intended for outdoor use in may further include other components for water-blocking such as one or more water-swellable tapes, yarns, or the like. Likewise, other materials are possible for filling material 58a such as cellulose, aramid, carbon fiber, or the like. Additionally, the cable jacket can have other variations such as an optional second layer disposed on the outer surface of cable jacket 58. The second layer provides a smooth surface so the filling material such as e-glass is not exposed to an outer surface of the fiber optic cable, thereby making the fiber optic cable craft-friendly for handling purposes.

Additionally, if fiber optic cable 50 is bent into relatively small radii and cable jacket 58 deforms, then buffered optical fiber 10 rotates since its wings 14a,14b tend to align along the long axis of the deformed cable jacket. Further, the wings of the buffer layer tend to keep the optical fiber near the middle of the fiber optic cable. Of course, other fiber optic cable embodiments of the present invention can use a buffered optical fiber having a generally round cross-section (i.e., no wings).

Illustratively, FIG. 6a depicts fiber optic cable 50 bent about an outside corner 60 and depicts a series of planes through the cross-section of fiber optic cable 50 at different positions in the bend. FIG. 6b depicts a series of cross-sectional views of fiber optic cable 50 as it is being bent about outside corner 60. The upper cross-section of FIG. 6b depicts fiber optic cable 50 along plane 1-1. As shown, buffered optical fiber 10 in a generally horizontal position as bending of fiber optic cable 50 about outside corner 60 begins. Additionally, buffered optical fiber 10 tends to migrate towards a radially outward portion of fiber optic cable 50 (i.e., a larger bend radii/lower stress position). Moreover, the wings of the buffered optical fiber may deflect slightly to accommodate this migration to the outside. As bending of fiber optic cable 50 progress about the outside corner, buffered optical fiber 10 starts to rotate toward a vertical position as depicted in the middle cross-sectional view of FIG. 6b, which represents plane 2-2. As the bending of fiber optic cable 50 continues about the outside corner, cable jacket 58 deforms (i.e., kinks) into a generally oval cross-section while buffered optical fiber 10 further rotates toward a vertical position to accommodate the bending, which represents plane 3-3. Furthermore, the wings push buffered optical fiber toward the middle of the deformed jacket so that any fastener such as a staple used for securing the fiber optic cable tends to avoid the optical fiber, thereby inhibiting damage.

Figure 7:
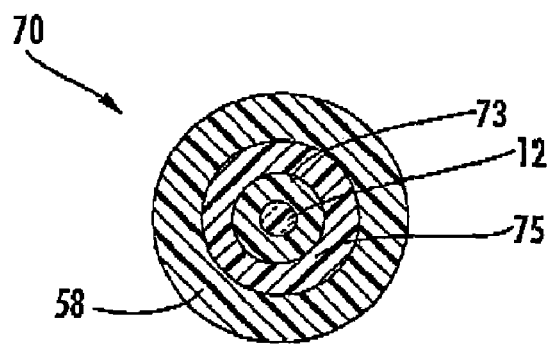
FIG. 7 is a cross-sectional view of another fiber optic cable according to the present invention.

FIG. 7 is a cross-sectional view of a fiber optic cable 70 according to the present invention. Fiber optic cable 70 includes a buffered optical fiber 73 having a generally round shape that is surrounded by a foam layer 75, thereby by forming a cable core (not numbered). The cable core is generally surrounded by cable jacket 58. In this embodiment, foam layer 75 protects the buffered optical fiber 73 if cable jacket 58 is kinked when bent into a relatively small bend radii. Likewise, foam layer 75 provides a compressible material for absorbing a crushing force when fiber optic cable 70 is fastened to the wall with a staple or the like. In other words, foam layer 73 aids preserving optical performance during installation where the bend radius is relatively small or the fiber optic cable is attached using mechanical fasteners.

The structures of the present invention may also advantageously use optical fibers that are relatively bend resistant for preserving optical performance when subjected to relatively small bend radii. For instance, fiber optic cable 50 has a relatively small delta attenuation when bent into a relatively small bend radius. By way of example, when bent into a radius of about 10 millimeters for about 90 degrees the optical fiber 12 of fiber optic cable preferably has an optical attenuation of about 0.1 dB or less.

By way of example, bend resistant optical fibers may have microstructures and/or other configurations that allow reduced bend radii while preserving optical performance. Microstructured optical fibers disclosed herein comprise a core region and a cladding region surrounding the core region, the cladding region comprising an annular hole-containing region comprised of non-periodically disposed holes such that the optical fiber is capable of single mode transmission at one or more wavelengths in one or more operating wavelength ranges. The core region and cladding region provide improved bend resistance, and single mode operation at wavelengths preferably greater than or equal to 1500 nm, in some embodiments also greater than 1400 nm, in other embodiments also greater than 1260 nm. The optical fibers provide a mode field at a wavelength of 1310 nm preferably greater than 8.0 microns, more preferably between 8.0 and 10.0 microns. In preferred embodiments, optical fiber disclosed herein is thus single-mode transmission optical fiber.

In some embodiments, the microstructured optical fiber disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width of less than 12 microns, the annular hole-containing region has a regional void area percent of less than 30 percent, and the non-periodically disposed holes have a mean diameter of less than 1550 nm.

By "non-periodically disposed" or "non-periodic distribution", we mean that when one takes a cross section (such as a cross section perpendicular to the longitudinal axis) of the optical fiber, the non-periodically disposed holes are randomly or non-periodically distributed across a portion of the fiber. Similar cross sections taken at different points along the length of the fiber will reveal different cross-sectional hole patterns, i.e., various cross sections will have different hole patterns, wherein the distributions of holes and sizes of holes do not match. That is, the voids or holes are non-periodic, i.e., they are not periodically disposed within the fiber structure. These holes are stretched (elongated) along the length (i.e. in a direction generally parallel to the longitudinal axis) of the optical fiber, but do not extend the entire length of the entire fiber for typical lengths of transmission fiber.

For a variety of applications, it is desirable for the holes to be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

The optical fiber disclosed herein may or may not include germania or fluorine to also adjust the refractive index of the core and or cladding of the optical fiber, but these dopants can also be avoided in the intermediate annular region and instead, the holes (in combination with any gas or gases that may be disposed within the holes) can be used to adjust the manner in which light is guided down the core of the fiber. The hole-containing region may consist of undoped (pure) silica, thereby completely avoiding the use of any dopants in the hole-containing region, to achieve a decreased refractive index, or the hole-containing region may comprise doped silica, e.g. fluorine-doped silica having a plurality of holes.

Figure 8:
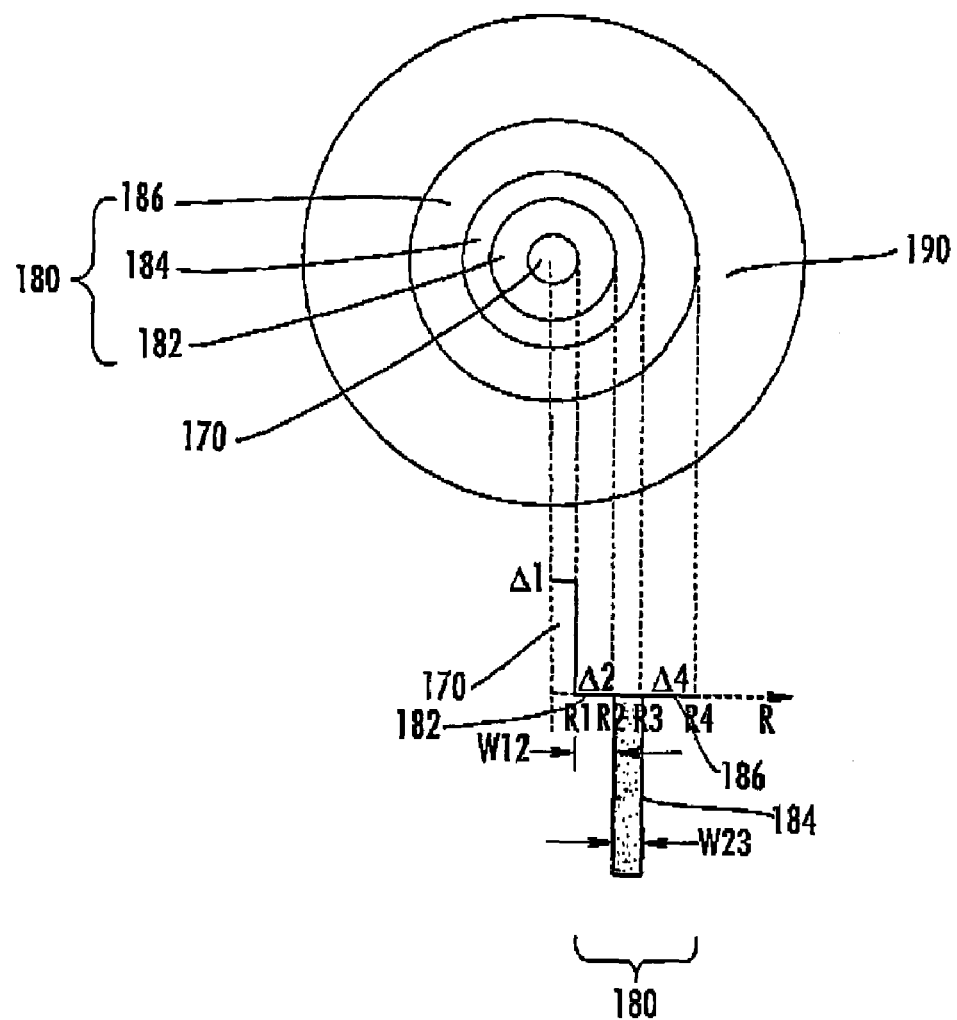
FIG. 8 is a cross-sectional representation of a bend resistant optical fiber useful for buffered optical fibers of the present invention.

In one set of embodiments, the core region includes doped silica to provide a positive refractive index relative to pure silica, e.g. germania doped silica. The core region is preferably hole-free. As illustrated in FIG. 8, in some embodiments, the core region 170 comprises a single core segment having a positive maximum refractive index relative to pure silica $\Delta_1$ in %, and the single core segment extends from the centerline to a radius $R_1$. In one set of embodiments, 0.30%<$\Delta_1$<0.40%, and 3.0 µm<$R_1$<5.0 µm. In some embodiments, the single core segment has a refractive index profile with an alpha shape, where alpha is 6 or more, and in some embodiments alpha is 8 or more. In some embodiments, the inner annular hole-free region 182 extends from the core region to a radius $R_2$, wherein the inner annular hole-free region has a radial width W12, equal to R2−R1, and W12 is greater than 1 µm. Radius R2 is preferably greater than 5 µm, more preferably greater than 6 µm. The intermediate annular hole-containing region 184 extends radially outward from R2 to radius R3 and has a radial width W23, equal to R3−R2. The outer annular region 186 extends radially outward from R3 to radius R4. Radius R4 is the outermost radius of the silica portion of the optical fiber. One or more coatings may be applied to the external surface of the silica portion of the optical fiber, starting at R4, the outermost diameter or outermost periphery of the glass part of the fiber. The core region 170 and the cladding region 180 are preferably comprised of silica. The core region 170 is preferably silica doped with one or more dopants. Preferably, the core region 170 is hole-free. The hole-containing region 184 has an inner radius R2 which is not more than 20 µm. In some embodiments, R2 is not less than 10 µm and not greater than 20 µm. In other embodiments, R2 is not less than 10 µm and not greater than 18 µm. In other embodiments, R2 is not less than 10 µm and not greater than 14 µm. The hole-containing region 184 has a radial width W23 which is not less than 0.5 µm. In some embodiments, W23 is not less than 0.5 µm and not greater than 20 µm. In other embodiments, W23 is not less than 2 µm and not greater than 12 µm. In other embodiments, W23 is not less than 2 µm and not greater than 10 µm. Such fiber can be made to exhibit a fiber cutoff of less than 1400 nm, more preferably less than 1310 nm, and a 20 mm macrobend induced loss of less than 1 dB/turn, preferably less than 0.5 dB/turn, even more preferably less than 0.1 dB/turn, still more preferably less than 0.05 dB/turn, yet more preferably less than 0.03 dB/turn, and even still more preferably less than 0.02 dB/turn, and more preferably a 12 mm macrobend induced loss of less than 5 dB/turn, preferably less than 1 dB/turn, and more preferably less than 0.5 dB/turn, and a 8 mm macrobend induced loss of less than 5 dB/turn, preferably less than 1 dB/turn, more preferably less than 0.5 dB/turn with the macrobend induced loss being measured at a reference wavelength of 1550 nanometers.

Figure 9:
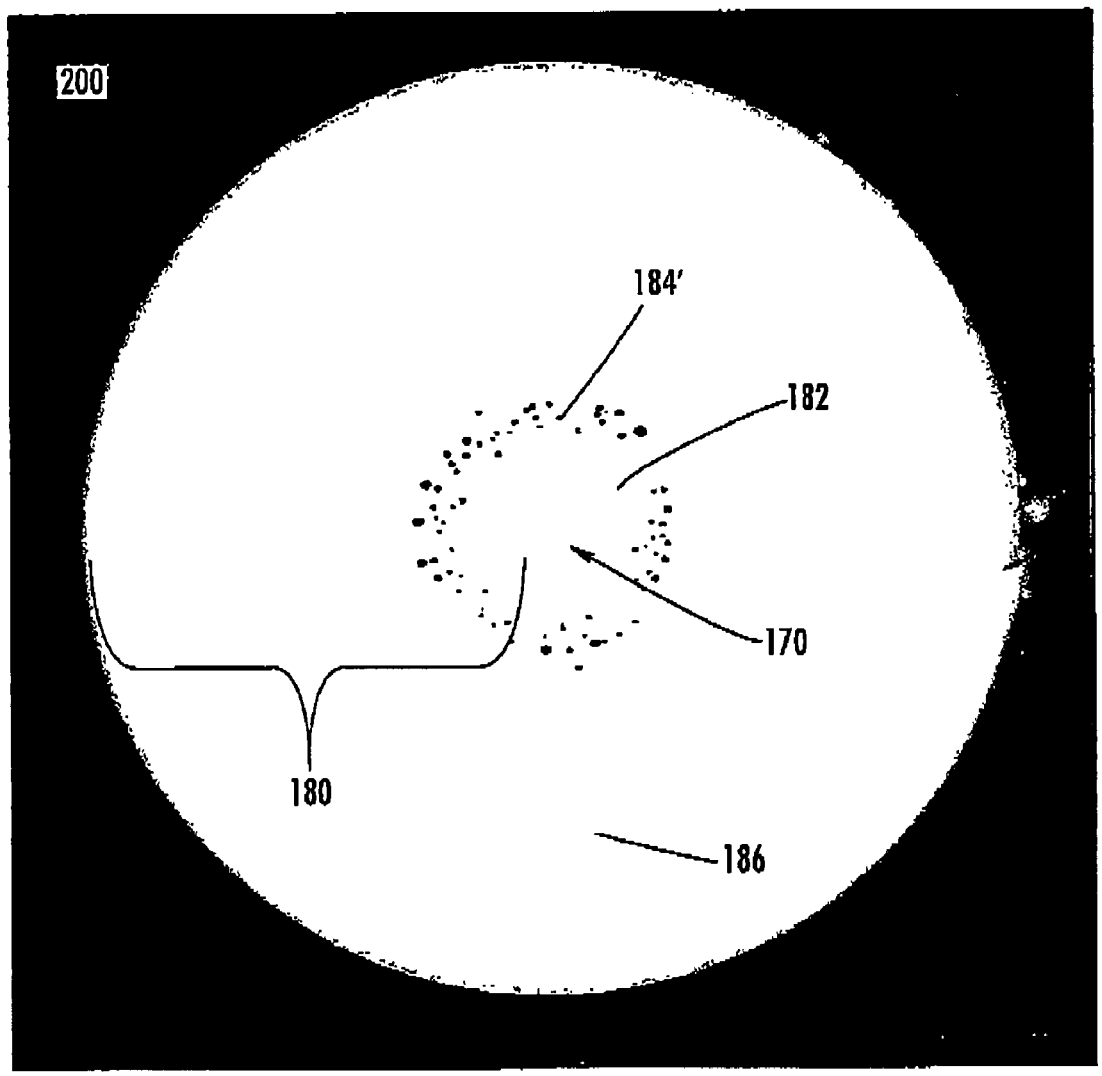
FIG. 9 is a cross-sectional picture of the bend resistant optical fiber used in the buffered optical fiber of FIG. 2.

An example of a suitable bend resistant optical fiber 200 is illustrated in FIG. 9. Optical fiber 200 in FIG. 8 comprises a core region which is surrounded by a cladding region which comprises randomly disposed voids which are contained within an annular region spaced from the core and positioned to be effective to guide light along the core region. Additionally, other types of bend resistant optical fibers may be used with the concepts of the present invention.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

The invention claimed is:

1. A buffered optical fiber comprising:
   at least one optical fiber;
   a buffer layers the buffer layer generally surrounding the at least one optical fiber and having a non-round cross-section that includes a plurality of wings that are an integrally formed by the buffer layer; and
   a cable jacket disposed about the buffered optical fiber for forming a fiber optic cable, wherein the fiber optic cable allows a bend radius of about 10 millimeters or less.

2. The buffered optical fiber of claim 1, wherein the at least one optical fiber is a bend resistant optical fiber.

3. The buffered optical fiber of claim 1, wherein the plurality of wings includes a first wing and a second wing that are disposed about 180 degrees apart.

4. The buffered optical fiber of claim 1, wherein the buffer layer includes at least one preferential tear portion.

5. The buffered optical fiber of claim 1, the buffer layer generally surrounding at least two optical fibers.

6. The buffered optical fiber of claim 1, further including a cable jacket disposed about the buffered optical fiber.

7. The buffered optical fiber of claim 1, further including a cable jacket disposed about the buffered optical fiber, wherein the cable jacket is formed from a glass reinforced polymer.

8. The buffered optical fiber of claim 1, further including a cable jacket disposed about the buffered optical fiber, wherein the cable jacket is formed from a glass reinforced polyvinylchloride.

9. A buffered optical fiber comprising:
at least one optical fiber, wherein the at least one optical fiber is a bend resistant optical fiber;
a buffer layer, the buffer layer generally surrounding the at least one optical fiber and having a non-round cross-section that includes a first wing and a second wing; and
a cable jacket disposed about the buffered optical fiber for forming a fiber optic cable, wherein the fiber optic cable allows a bend radius of about 10 millimeters or less while maintaining a suitable level of optical performance.

10. The buffered optical fiber of claim 9, wherein the first wing and the second wing are disposed about 180 degrees apart.

11. The buffered optical fiber of claim 9, wherein the buffer layer includes at least one preferential tear portion.

12. The buffered optical fiber of claim 9, the buffer layer generally surrounding at least two optical fibers.

13. The buffered optical fiber of claim 9, further including a cable jacket disposed about the buffered optical fiber.

14. The buffered optical fiber of claim 9, further including a cable jacket disposed about the buffered optical fiber, wherein the cable jacket is formed from a glass reinforced polymer.

15. The buffered optical fiber of claim 9, further including a cable jacket disposed about the buffered optical fiber for forming a fiber optic cable, wherein the cable jacket is formed from a glass reinforced polyvinylchloride.

16. A fiber optic cable comprising:
at least one optical fiber, wherein the at least one optical fiber is a bend resistant optical fiber;
a buffer layer, the buffer layer generally surrounding the at least one optical fiber; and
a cable jacket, the cable jacket disposed about the buffered optical fiber, wherein the fiber optic cable allows a bend radius of about 10 millimeters or less while maintaining a suitable level of optical performance, wherein the buffer layer has a non-round cross-section that includes a first wing and a second wing and the first wing and the second wing are disposed about 180 degrees apart.

17. The buffered optical fiber of claim 16, wherein the buffer layer includes at least one preferential tear portion.

18. The buffered optical fiber of claim 16, the buffer layer generally surrounding at least two optical fibers.

19. The buffered optical fiber of claim 16, wherein the cable jacket is formed from a glass reinforced polymer.

20. The buffered optical fiber of claim 15, wherein the cable jacket is formed from a glass reinforced polyvinylchloride.

* * * * *